UNITED STATES PATENT OFFICE.

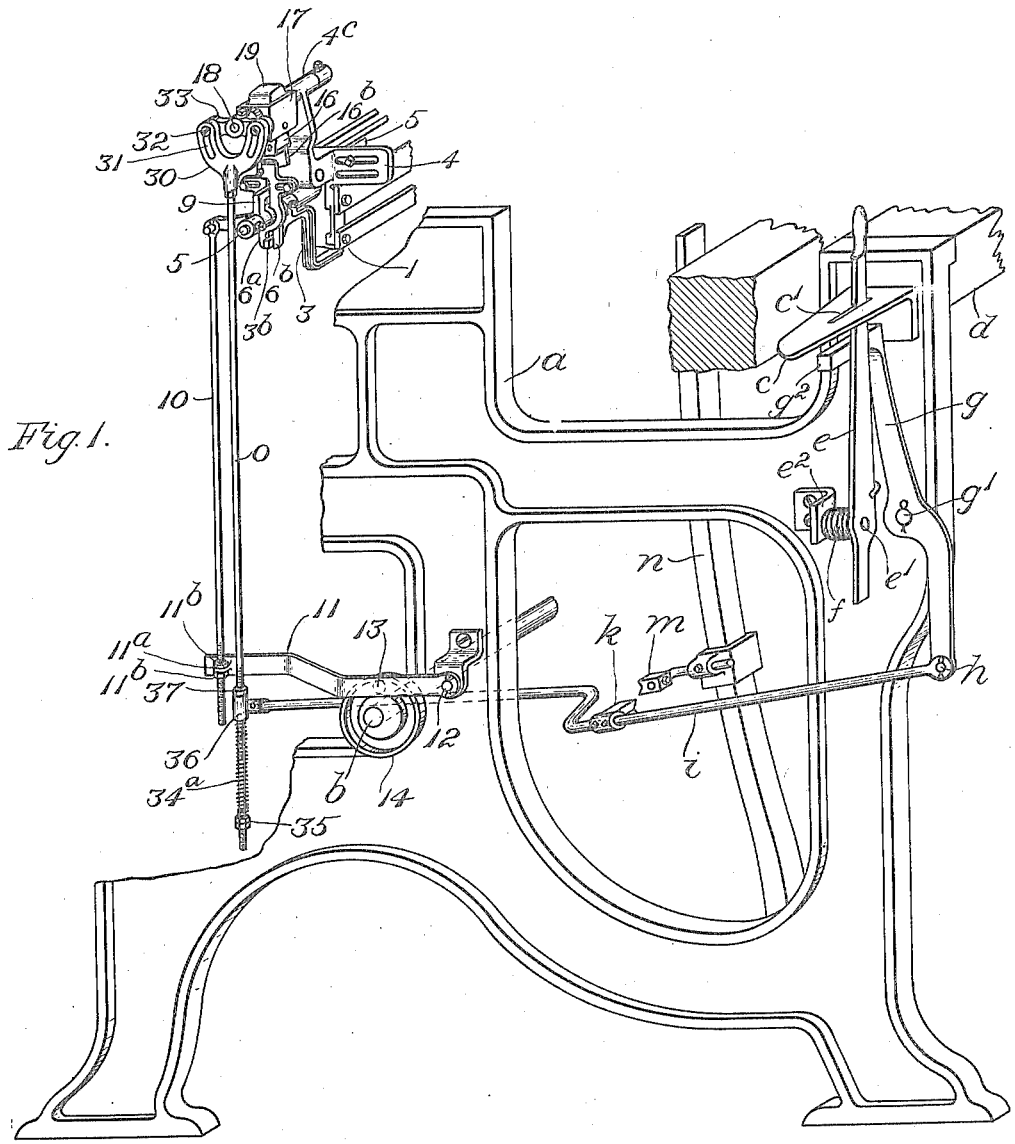

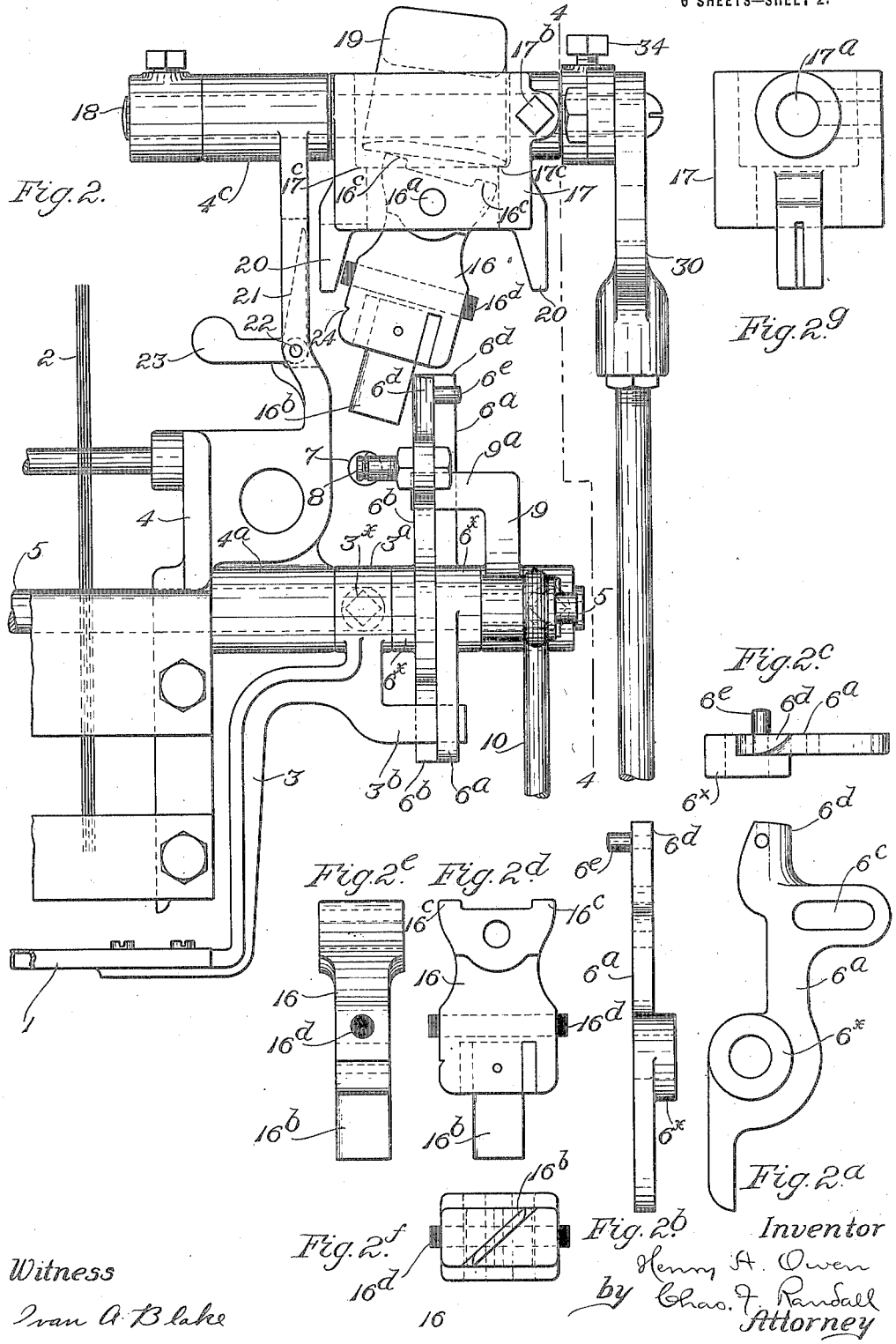

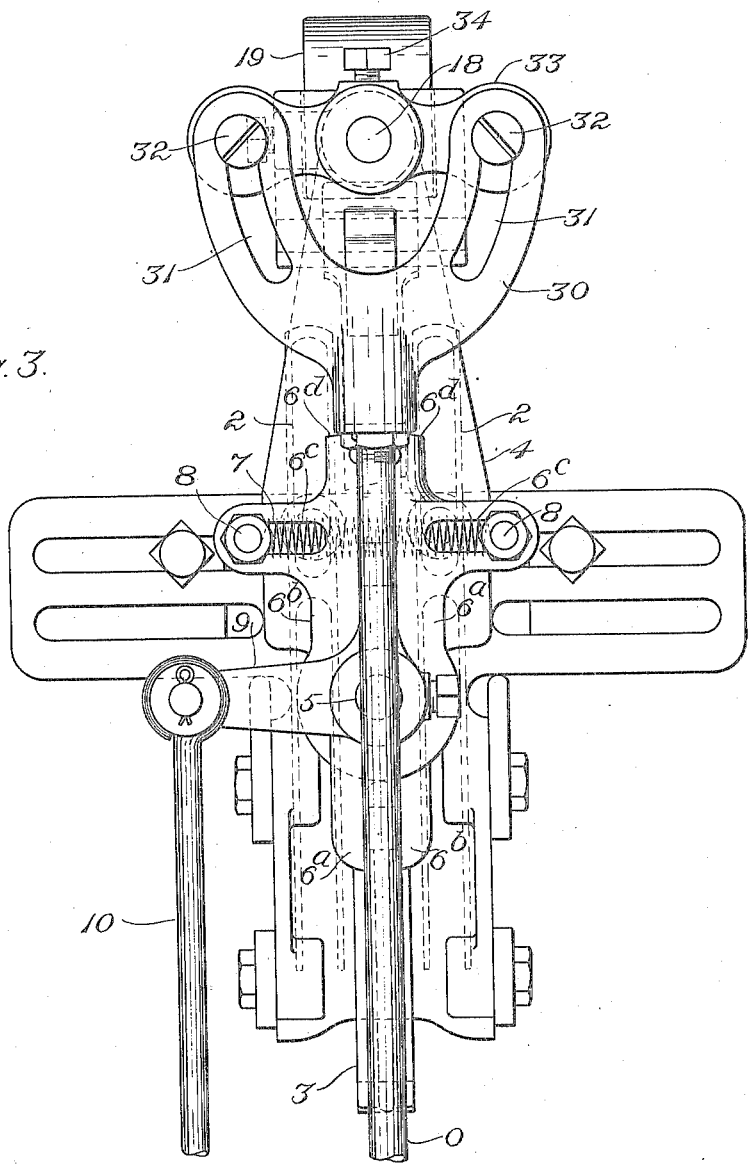

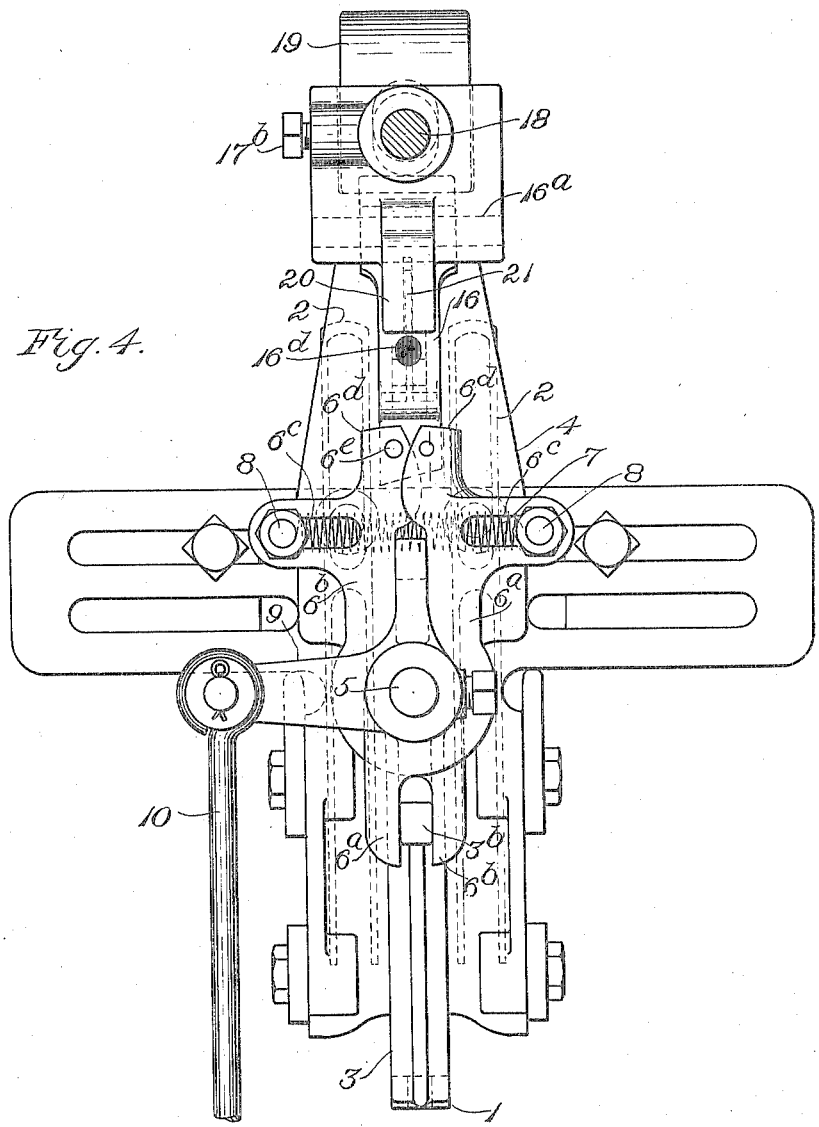

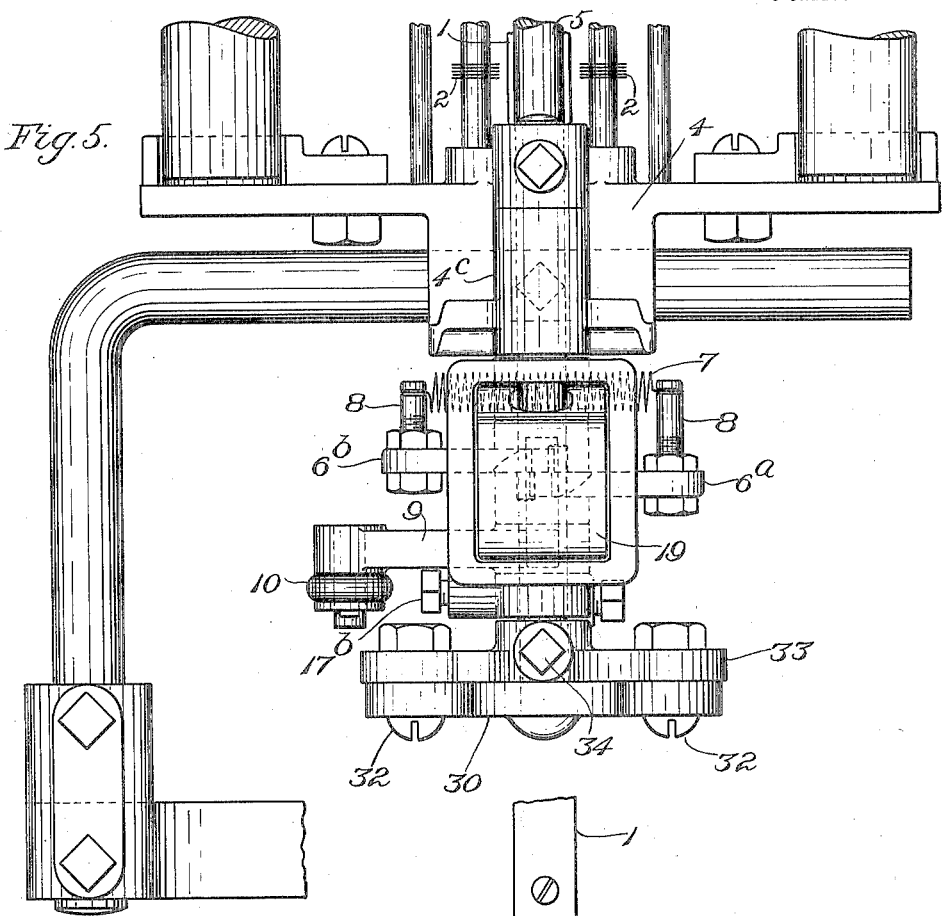
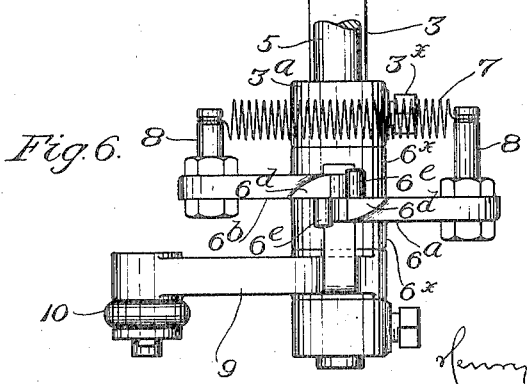

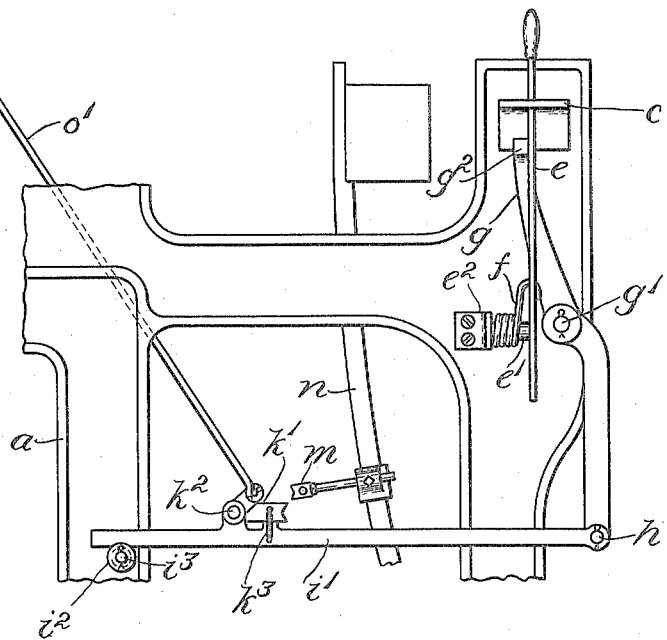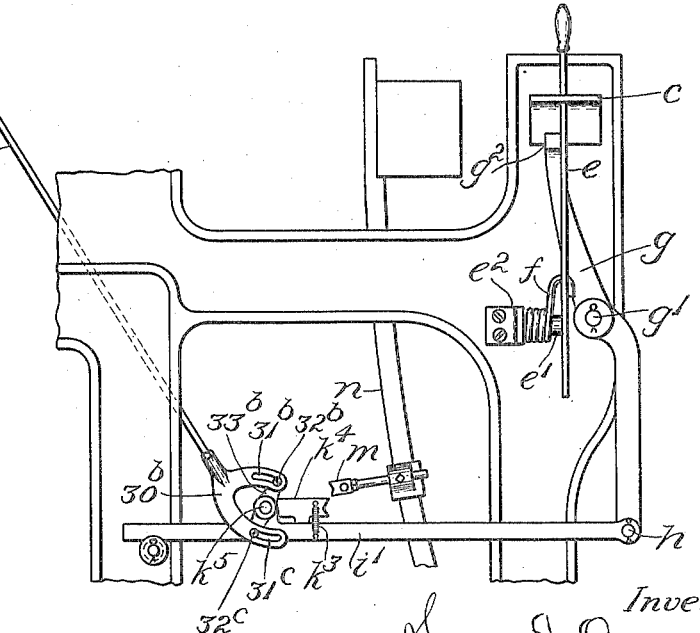

HENRY A. OWEN, OF WHITINSVILLE, MASSACHUSETTS, ASSIGNOR, BY MESNE ASSIGN-
MENTS, TO DRAPER CORPORATION, OF HOPEDALE, MASSACHUSETTS, A CORPORA-
TION OF MAINE.

WARP STOP-MOTION FOR LOOMS.

1,291,102.     Specification of Letters Patent.     Patented Jan. 14, 1919.

Application filed June 25, 1915. Serial No. 36,229.

*To all whom it may concern:*

Be it known that I, HENRY A. OWEN, a citizen of the United States, residing at Whitinsville, in the county of Worcester, State of Massachusetts, have invented a certain new and useful Improvement in Warp Stop-Motions for Looms, of which the following is a specification, reference being had therein to the accompanying drawings.

The invention has relation to the devices which are employed in looms and various other machines for detecting and indicating breakage, failure, or excessive slackness of one or more of a plurality of yarns or threads operated upon.

The features of the invention are designed more particularly to be employed in warp-stop-motions for looms, but they are not necessarily restricted to use in looms, being applicable to other machines as well.

The improvements involve more especially the feeler-actuating devices of a stop-motion mechanism; the tripping-devices which act when the feeler is obstructed in its movement by a detector that has changed its position in consequence of breakage, failure, or excessive slackness of a yarn or thread which controls it; the connections between the tripping-devices and the knocking-off devices; and the means of rendering at will the stop-motion mechanism inoperative to stop the loom or other machine in which it is employed. The invention provides a novel give-way between the feeler and the so-called actuator therefor; novel means for tripping or indicating the knocking-off devices into action when the movement of the feeler is obstructed by an abnormally disposed detector; novel means of rendering the stop-motion mechanism inoperative to occasion stoppage, without interfering with the running of the machine in which it is employed; and various other novel and advantageous features and elements. The accompanying drawings show an illustrative embodiment of the general features of the invention containing also various special features of invention. The said illustrative embodiment is characterized by the employment, in the feeler-mechanism and tripping-devices, of elements working normally on the principle of an escapement so long as the moving feeler remains unobstructed, and acting to indicate the tripping-devices positively into action when the feeler is obstructed. The said embodiment includes a combination give-way and transmitter. The drawings show, in addition, modified forms of connections between the tripping-devices and the knocking-off devices.

In the drawings,—

Figure 1 is an isometric view showing certain portions of a loom and its warp-stop-motion, with the said illustrative embodiment of the features of the invention applied thereto.

Fig. 2 is a view in rear elevation showing on an enlarged scale certain parts at the same end of the warp-stop-motion that is shown in Fig. 1.

Figs. 2ᵃ to 2ᴳ are views of details.

Fig. 3 is a view in side elevation showing the parts of Fig. 2.

Fig. 4 is an elevation similar to Fig. 3 but with certain parts removed on the section line 4, 4, Fig. 2.

Fig. 5 is a plan view of the parts that are shown in Fig. 2.

Fig. 6 is a plan view of some of the said parts, showing certain features that do not appear clearly in Fig. 5.

Figs. 7 and 8 are diagrammatic elevations showing modified forms of tripping connections.

Having reference to the illustrative embodiment shown in Figs. 1 to 5:—

In this particular embodiment, the feeler 1 is mounted to swing adjacent the lower ends of the detectors 2, 2, Figs. 2 and 4, through being provided with supporting arms, one of which is shown at 3, hung suitably in connection with the warp-stop-motion stands, one of which is shown at 4. So far as the features of the invention are concerned, it is immaterial for the most part whether the detector-engaging member is carried by supporting-arms and swings in an arc, as in the present instance, or is mounted otherwise or moves in a straight path, or whether the axis around which it swings is above or below, or whether the movement of the feeler is forward and rearward, or transversely of the loom. In the present instance the movement is forward and rearward, *i. e.*, longitudinally of the warp-yarns or threads, and the supporting-arms 3 hang down from a rockshaft 5 extending across the loom and mounted in bearings, (one of which is shown at 4ᵃ, Fig.

2) provided therefor in connection with the stands 4. Each of the said arms is fixed to the said rockshaft by means of a clamping screw 3ˣ, Fig. 6, in connection with the hub 3ᵃ of the arm.

The give-way devices which transmit movement with yielding force to the feeler, to enable it to be arrested in its to-and-fro movement by the encounter with a displaced detector, comprise a transmitter consisting of spring-tensioned members engaging with opposite sides of a projection 3ᵇ from the arm 3, and having imparted to them in unison by the actuator the to-and-fro movement required for the actuation of the feeler. By reason of their engagement with the said projection, they operate in their own movement to impart movement to the feeler. The said members may be variously constructed, arranged, and mounted within the scope of the invention, but preferably are in the form of a pair of levers 6ᵃ, 6ᵇ, mounted side by side upon a portion of rockshaft 5 which projects outwardly beyond the hub 3ᵃ of arm 3 of the feeler. One of the said levers is shown detached in side elevation in Fig. 2ᵃ, Sheet 2, in edge view in Fig. 2ᵇ, and in plan in Fig. 2ᶜ. The said levers are loose upon the rockshaft, so that they are adapted to turn thereon when the occasion for such turning presents itself, and are closed against the opposite sides of the said projection 3ᵇ by the tension of a contracting spiral spring 7 which extends from a stud 8 carried by one lever to a similar stud carried by the other lever. The to-and-fro movement is imparted to the levers 6ᵃ, 6ᵇ, by an actuator 9, the latter itself having given to it a to-and-fro movement, and having a lug 9ᵃ which is entered between the levers in manner like unto that in which the projection 3ᵇ of the feeler is entered between them.

The construction of the actuator, mode of mounting the same, and manner and means of actuating it may vary in practice. Herein the actuator is in the form of a bell-crank and is mounted upon the rockshaft 5 alongside the levers 6ᵃ, 6ᵇ, with capacity to turn thereon. One arm of the bell-crank is provided with the said lateral projection 9ᵃ. The power-connections by means of which the actuator is actuated comprise in the present instance a rod 10 extending from the other arm of the bell-crank 9 to a lever 11, Fig. 1, which is pivoted upon the loom-side $a$ at 12, the said lever being provided with a pin or roll 13 that works in the groove of a cam 14 fixed upon the cam-shaft $b$ of the loom. As the cam-shaft and cam rotate in the operation of the loom, the cam 14 causes the lever 11 to swing, and movement is transmitted by the rod 10 from the said lever to the actuator 9.

As the actuator rocks or swings around the axis of the feeler rockshaft it rocks or swings the levers 6ᵃ, 6ᵇ, around such axis, and by reason of their engagement with the projection 3ᵇ of the arm 3 fixed upon rockshaft 5 they communicate rocking or swinging movement to the feeler and to the rockshaft itself. Consequently, so long as the feeler encounters no obstructing detector, the actuator, the levers 6ᵃ, 6ᵇ, the feeler, and the feeler rockshaft, all vibrate in unison. In the movement of the actuator 9 in either direction, its lug 9ᵃ acts positively against one lever to move the latter, and from the positively actuated arm or lever the other arm or lever is actuated yieldingly through the spring 7. The yieldingly actuated lever in turn, through its engagement with projection 3ᵇ of the feeler-arm, actuates the feeler with yielding force. Therefore, in either direction of movement of the feeler, in case the feeler is obstructed by a detector, the spring 7 yields to permit the lever which is impelling the feeler in its feeling stroke to give way. For convenience in construction, the levers 6ᵃ, 6ᵇ, are levers of the first order and are crossed, as indicated clearly in the drawings, and the lug 9ᵃ and projection 3ᵇ are interposed between the two levers at opposite sides of the axis of the feeler-rockshaft, respectively. The results in practice would be the same if the said lug and projection were interposed between the two levers at one and the same side of the said axis. To permit the tension of the spring 7 to be varied as required in order to secure the proper action of the parts, the studs 8, 8, are mounted adjustably in slots 6ᶜ, 6ᶜ in the upper arms of the levers 6ᵃ, 6ᵇ. These slots enable the studs to be set at a greater or less distance apart for the regulation of the spring-tension.

As indicated hereinbefore, I employ for indicating or calling, i. e., tripping, the knocking-off devices into action when the movement of the feeler is obstructed by a displaced detector, tripping devices, comprising a two-part transmitter coöperating with a dog having movement in two directions at an angle to each other. So long as the feeler is unobstructed by a dropped detector, the transmitter encounters the dog and moves it idly to one side or the other depending upon the direction in which the transmitter moves. But, when the movement of the feeler is obstructed by a dropped detector, the dog moves lengthwise with one part of the transmitter and the knocking-off mechanism is brought into action. The levers 6ᵃ, 6ᵇ, of the give-way constitute the two parts of the transmitter. The upper arm of each of the said levers is provided with a lug 6ᵈ for more immediate coöperation with the dog. While the levers are closed together upon the projections or lugs 9ᵃ and 3ᵇ of the actuator and feeler, respectively, the two lugs 6ᵈ, 6ᵈ, are located side by side as in Figs. 2, 5 and 6. To enable them to fit together closely, their adjacent side-faces are straight and parallel with each other as shown in Figs. 2ᶜ and 6. Their opposite faces, however, are beveled off as shown in the said figures, so that each lug is narrowed transversely at one edge thereof. The narrowed edges of the two lugs face in opposite directions, as in Fig. 6. During the regular working of the parts, while the yarns or threads continue in proper condition, so that the feeler is unobstructed in its movements and the levers 6ª, 6ᵇ, swing to and fro in unison, the combined lugs coact with a dog 16ᵇ which projects downward from and is carried by a laterally movable member 16, Fig. 2, located above the levers 6ª, 6ᵇ. The member 16 is shown separately in Figs. 2ᵈ, 2ᵉ, 2ᶠ. The capacity of the said member for lateral movement, i. e., movement in a direction at right angles to the direction of the swinging movement of levers 6ª, 6ᵇ, may be provided for variously. In this instance the said member is mounted pivotally at its upper end upon a pivot-pin 16ª, between the front and rear cheeks or sides of a box 17 (shown separately in end elevation in Fig. 2ᵍ). The member 16 tends to occupy a position at the middle of its laterally swinging stroke, with the width of its dog crossing the path in which lugs 6ᵈ, 6ᵈ, swing back and forth. The said member can assume such position only when both of the lugs 6ᵈ, 6ᵈ, are at or near the end of their stroke in one direction or the other and clear of the dog. When the member is in its said intermediate position, movement of the lugs from one end of their stroke toward the other end thereof will carry against one flat face of the dog 16ᵇ the oblique face of the lug which is leading in such movement. In order that the contact of the said oblique face of the said lug with the said flat face of the dog may operate with the effect of giving movement to the member 16 transversely, the dog is disposed obliquely, with its obliquity corresponding in direction with that of the opposite oblique faces of the lugs 6ᵈ, 6ᵈ. Consequently, the pressure of the said oblique face of the leading lug against one oblique face of the dog will wedge the dog to one side, thus swinging the member 16 to that side, as for instance, in Fig. 2. As soon as the lugs 6ᵈ, 6ᵈ, are out of the way the member 16 will return transversely toward its intermediate position, so that the width of the dog will again cross the path taken by the lugs 6ᵈ, 6ᵈ, in their swinging movements. In the return movement of the levers and lugs toward the first end of their stroke which now takes place the oblique face of the lug which leads in the movement in this direction will encounter the other flat face of the dog, with the result that such lug will wedge the dog and member 16 in the opposite direction transversely while the lugs complete their stroke, and so on. Thus the levers 6ª, 6ᵇ, in being swung back and forth by the actuator will act through the alternate engagement of the oblique faces of their lugs 6ᵈ, 6ᵈ, with the opposite oblique faces of the dog 16ᵇ to swing the member 16 back and forth transversely, and the combined lugs will clear the dog in the stroke of the levers and lugs in each direction. This action will continue so long as the feeler remains unobstructed. In case, however, the movement of the feeler in either direction is obstructed by a detector, the yieldingly-actuated lever which "follows" in the conjoint or unison movement of the two levers 6ª, 6ᵇ, by which such movement of the feeler is caused, will be arrested at an intermediate point in the said conjoint movement by the projection 3ᵇ of the feeler. Consequently, although the lug 6ᵈ of the positively-actuated lever will clear the dog after pressing it to one side, the lug of the detained yieldingly-actuated lever will remain in line transversely with the adjacent edge of the dog 16ᵇ. As a result, when the member 16 swings transversely back toward its normal intermediate position after being cleared by the lug of the positively-actuated lever, the said edge of the dog will bring up against the straight side of the lug of the detained lever at a point between a push pin 6ᵉ upon the latter lug and the thin edge of the lug. In the stroke of the actuating bell-crank 9 which will now actuate the levers in the other direction for the purpose of producing the return movement of the feeler the detained lever will be the positively-actuated one, and the said pin 6ᵉ will be carried against the said edge of the dog. In order that the lever 16 may be permitted to accompany the said positively-actuated lever, the box 17 in which the member 16 is pivoted is fixedly attached to a supporting rockshaft 18 occupying a position above the rockshaft 5, parallel with the latter, and fitted in a bearing 4ᶜ with which an upstanding portion of stand 4 is furnished. The box 17 has eyes 17ª in its inner and outer ends by means of which it is sleeved upon the rockshaft 18, and it is made fast to the rockshaft by means of a clamping screw 17ᵇ, so that pressure acting upon either edge of the dog 16ᵇ in a direction transverse to the axis of the rockshaft operates to swing the rockshaft in such direction and rock the rockshaft about the said axis. This rocking of the rockshaft is utilized for calling the knocking-off devices into action, as presently will be explained. Normally, the rockshaft and box occupy an intermediate position in which member 16 hangs vertically.

The levers 6ª, and 6ᵇ, constitute a transmitter which during the normal running of the loom swings the feeler back and forth. During such running the transmitter encounters the dog first on one side and then on the other and swings the dog transversely and idly first to one side of the transmitter and then to the other side. After each idle swing of the dog it is restored to its normal central position by the weight 19. When, however, the movement of the feeler is obstructed by a dropped detector the advancing lever through the yielding of the spring 7, passes by the dog swinging it to one side; but the dog then immediately is restored toward its central position in the path of the push-pin of the following lever of the transmitter which is prevented from moving lengthwise by the dropped detector. Thereupon, on the return movement or stroke of the two levers of the transmitter, the push-pin of the heretofore obstructed lever carries the dog lengthwise with it, thus positively oscillating the rocker, thereby bringing into action the knocking-off mechanism as hereinafter described.

I preferably combine with the tripping dog means for yieldingly checking the beat-movements thereof. Such means may vary in different cases, and various yielding checks such as have been employed in more or less analogous connections may be utilized. The means shown in the drawings comprises a weight 19, which occupies the box 17 above the head of the swinging member 16. Shoulders $17^c$, $17^c$, upon the interior of the box serve as rests for the opposite ends of the said weight. The upper portion of the weight is of shorter length than its lower portion, and the ends taper upward slightly, so as to permit endwise rocking movements of the weight to take place. A hole through the weight from end to end thereof permits the rockshaft 18 to extend through the weight, such hole being enough larger than the shaft to permit vertical play of the weight. The head-portion of member 16 is formed with shoulders $16^e$, $16^e$, at opposite sides of the pivot $16^a$ for engagement with the bottom of the weight. When the member 16 is swung from its intermediate position in either direction, the rising shoulder acts to raise the corresponding end of the weight, and as such action takes place the other end of the weight rocks or turns upon the adjacent shoulder $17^c$ as upon a fulcrum. Consequently, the pressure of the weight takes effect largely upon the said rising shoulder at the corresponding side of pivot $16^a$, with the effect of opposing the swinging movement of the member 16 and checking such movement yieldingly after the oblique face of the actuating lug $6^b$ has cleared the oblique face of dog $16^b$ engaged thereby. Such pressure also acts with a tendency to assist the return of the member 16 transversely into its intermediate position, so as to obviate sticking of the said member in a position at one side. Any overthow of the said member in the return movement thereof is checked by the engagement of the other shoulder $16^e$ with the bottom of the weight, and the weight acts with a tendency to hold the member 16 in its proper intermediate position, with the flat oblique face of the dog presented in the path of the lugs $6^d$, $6^d$. A little lost motion or play between the member 16 and weight during the intermediate portion of the beat of the said member and its detent or tongue may be provided for. The opposite shoulders or rests $17^c$, $17^c$ serve alternately as fulcra for the respective ends of the weight as it is acted upon and raised by the respective shoulders $16^c$, $16^c$, of the member 16 alternately. The weight does not move in its entirety with the member 16 as the latter swings, but is raised at either end alternately as the respective shoulders of the member 16 rise alternately.

To limit the extent of the swinging movement of member 16 produced through the action of lugs $6^d$, $6^d$, of the transmitter upon the dog, $16^b$, stops 20, 20, are provided at opposite sides of the said member, the said stops in this instance being provided upon the lower part of the box 17. To avoid the wear and tear incident to metallic contact, and control rebound so as to insure a more reliable operation, I employ impact-deadening stopping means, constituted in the present instance of a contact-piece or pieces, $16^d$, designed to strike against the stops 20, 20, and composed of vulcanized fiber, leather, raw-hide, wood, or other suitable non-metallic material, vulcanized fiber being preferred.

To enable the action of member 16, and its indicating function, to be suppressed when required, as when it is desired to run the loom without arrest by the warp-stop-motion, I pivot a lock 21, Fig. 2, to the stand 4 at 22, the said lock being so constituted and arranged that by turning it down from its retracted position shown in Fig. 2 its acting portion may be caused to act against member 16 and move the latter so as to carry dog $16^b$ across to the other side of the path of movement of lugs $6^d$, $6^d$, and also so as to lock the member 16 in the retracted idle position thus given to it, with its dog out of the reach of the lugs and the pins $6^e$, $6^e$. A weighted handle-portion 23 serves to keep the lock normally in the retracted position that is occupied by it in Fig. 2. To insure that the lock when moved into its acting position shall continue to hold the member 16 in the inoperative position of the latter, a nick 24 is made in member 16 to receive the acting end of the lock. The adjacent stop-projection 20 is slotted to permit the acting portion of the lock to pass therethrough. The lock 21 enables the actuation of the tripping-devices through engagement of the transmitter with the dog to be prevented at will, and the tripping function to be thereby suppressed temporarily, while the feeler devices continue in operation, and without interfering with the action of the feeler.

In the construction herein described the feeler is actuated with yielding force in each direction, and is adapted to be limited in its stroke in either direction by a displaced detector. The tripping-devices are rendered operative by the limitation upon the stroke of the feeler by means of the displaced detector, but actuate the tripping-devices in the return stroke of the feeler after cessation of the pressure of the feeler against the displaced detector. Consequently, the tripping-devices are actuated independently of the pressure of the feeler against the detector. The actuation of the tripping-devices is positively effected, and from what has just been called to attention it will be perceived that the actuation of the tripping-devices is effected independently of the detectors, i. e., at a time when the latter are not subject to the pressure or pinch of the feeler. The use of very delicate detectors is permitted.

The rockshaft 18 is in effect a rocker. It is in operative control of the knocking-off devices, and its connections are such that when the rocker is rocked in either direction through the action of the transmitter upon the dog the said knocking-off devices are called into action. The precise character and arrangement of the knocking-off devices are not material so far as the invention is concerned, and devices such as those shown in the drawings may be employed if desired, or replaced by others. Referring to Fig. 1, $c$ is a stand extending outward from the loom-frame $a$ at one end of the breast-beam $d$, and having therein the usual slot $c'$ for the shipper-handle $e$, such slot having the ordinary offset to contain the shipper-handle when the latter is in "on" position. Shipper-handle $e$ is pivoted at $e'$ upon a stand $e^2$ fixed upon the loom-frame, and is provided with an actuating spring $f$. A knocking-off lever $g$, pivoted at $g'$ upon the loom-frame, has its upper arm provided with a lateral projection $g^2$ disposed just behind the upper portion of the shipper-handle. The lower arm of knocking-off lever $g$ has connected pivotally to it at $h$ the forward end of a rearwardly-extending rod or bar $i$ carrying a dog $k$ adapted to coöperate with a bunter $m$ carried by the adjacent sword $n$ of the lay. Normally, the rod or bar $i$ occupies a position in which dog $k$ is below the path in which bunter $m$ travels back and forth as the lay swings. When, however, the said rod or bar is raised, the dog is shifted into the said path, and accordingly in the next backward swing of the lay the bunter $m$ engages with the dog. As a result of this engagement the rod or bar $i$ is moved rearward and thus caused to operate the knocking-off lever so that the lateral projection $g^2$ of the latter presses the shipper-handle out of its offset holding notch, whereupon the spring $f$ actuates the shipper-handle to unship or throw off the driving-power and stop the loom. The rear end of rod or bar $i$ is connected with the lower end of an upright connecting-rod $o$ which at its upper end carries a head 30. See Figs. 1, 2, 3, 5. This head has opposite curved slots 31, 31, formed therein. The said slots receive crank-pins 32, 32, carried by the opposite arms of a crank-head 33 that is fixed upon the outer end of rock-shaft 18 by means of a clamping-screw 34. The crank-pins 32, 32, are located opposite each other upon the crank-head, and normally the upper ends of both slots 31, 31, engage with the said crank-pins and thereby the head 30, the rod $o$, and the rear end of the rod or bar $i$ are sustained vertically at such a height that the dog $k$ is below the path in which bunter $m$ moves, and consequently the bunter passes back and forth above the dog without engaging with the latter. When the rockshaft 18 is rocked in either direction, one of the crank-pins is moved upward thereby at the same time that the other is lowered. The rising crank-pin acts against the upper end of the slot in which it works, so as to raise head 30, rod $o$, and the rear end of rod or bar $i$, thereby placing dog $k$ in the path of bunter $m$. The said bunter in its next movement rearward engages with the dog and moves rod or bar $i$ rearward so as to cause the knocking-off lever $g$ to turn on its pivot $g'$ and dislodge the shipper-handle from the holding-notch of slot $c'$. Each slot 31 is formed on a curve which is concentric with the crank-pin occupying the upper end of the other slot, so that in the rocking movements of the rockshaft 18 and crank-head 33 the descending crank-pin may play freely in its slot. A spring-cushion is provided for the purpose of obviating straining and bending or breaking of the parts in case the dog $k$ in being raised should strike against the under side of bunter $m$. In Fig. 1, an expanding spiral spring $34^a$ is placed upon the lower portion of rod $o$, between a pair of nuts 35 and a short sleeve 36 upon said rod that is attached to the rear arm of rod or bar $i$. The said spring acts to hold the sleeve 36 against a nut 37 which is mounted upon the rod $o$ above the sleeve. The tension of the spring holds the sleeve in contact with the nut so that rod or bar $i$ is raised and lowered as rod $o$ is raised and lowered, until it happens that the upward movement carries dog $k$ upward against bunter $m$. Spring 34 will yield at such time.

The weight of the rear portion of the rod or bar $i$, and of the connecting rod $o$ and head 30, acts through the engagement of the upper ends of the slots 31, 31, with the crank-pins 32, 32, at opposite sides of the axis of the rockshaft 18, with the effect of holding the said rockshaft and the parts carried thereby properly centralized angularly with relation to the strokes of the transmitter. That is to say, the effect of the said weight is normally to maintain the rockshaft in such angular position that the dog will hang vertically.

In the case of the modified knocking-off devices of Fig. 7, the rod $i$ of Fig. 1 is replaced by a rod or bar $i'$ resting at its rear end upon a roll $i^2$ mounted upon a pin $i^3$ carried by the loom-frame. A dog $k'$ is mounted pivotally at $k^2$ upon the rod or bar $i'$ for coaction with the bunter $m$ carried by the lay-sword $n$. A spring $k^3$ is shown arranged to hold the engaging portion of the said dog normally below the path in which the engaging portion of the bunter $m$ travels as the lay swings forward and rearward, although this spring may be dispensed with and gravity alone depended upon to hold the dog out of the said path. An arm with which the dog $k'$ is furnished has pivotally connected with it the lower end of a connecting rod $o'$ extending down in a downwardly and forwardly inclined direction from the warp-stop mechanism, the said connecting rod $o'$ having attached to its upper end a slotted head $30^a$ corresponding substantially with the head 30 of Fig. 1, the curved slots $31^a$, $31^a$, of the said head receiving crank-pins $32^a$, $32^a$, carried by a crank-head $33^a$ mounted upon the outer end of the rockshaft 18 of the tripping-devices. The crank-head $33^a$ of this modification is so arranged that a line passing through the two crank-pins $32^a$, $32^a$, is disposed at right angles to the line of the connecting-rod $o'$, this arrangement enabling the pressure of the upper ends of the slots $31^a$, $31^a$, in the head $30^a$, against the crank-pins $32^a$, $32^a$, to operate to centralize the rockshaft 18 and the dog connected therewith so that the said dog shall hang normally in a vertical position.

In the case of the modification shown in Fig. 8 the dog $k^4$ mounted upon the rod $i'$ has in connection with its pivot $k^5$ a crank-head $33^b$ furnished with oppositely located crank-pins $32^b$, $32^c$, working in slots $31^b$, $31^c$, of a foot $30^b$ attached to the lower end of connecting-rod $o^4$, the said connecting-rod at its upper end being connected pivotally with a crank-arm $33^c$ mounted upon the outer end of the rock shaft 18 of the tripping-devices. The crank-pin $32^b$ of the crank-head $33^b$ in connection with the dog $k^4$ is engaged by the forward end of the slot $31^b$ in the upper arm of the head $30^b$, while the crank-pin $32^c$ is engaged by the rear end of the slot $31^c$ of the said head. In the case of this arrangement, swinging movement of the crank-arm $33^c$ with the rockshaft 18 toward the left in Fig. 8 operates through the engagement of the forward end of slot $31^b$ with crank-pin $32^b$ to raise the engaging portion of dog $k^4$ into the path of bunter $m$, while crank-pin $32^c$ plays idly in the slot $31^c$; whereas movement of the crank-arm $33^c$ in the direction from left to right from its position in Fig. 8 causes the rear end of slot $31^c$ to act against the crank-pin $32^c$ to rock the dog $k^4$ into position to be engaged by bunter $m$, while the crank-pin $32^b$ plays idly in the slot $31^b$ of the head $30^b$.

For the purpose of enabling the path of movement of the lugs $6^d$, $6^d$, of the transmitter to be adjusted angularly with reference to the dog, the rod 10 is engaged with the cam-operated lever 11 in manner enabling the said rod to be shifted lengthwise relative to the said lever. Thus the lower end-portion of the rod 10 is screw-threaded, and at the upper and lower sides of the ear $11^a$ of the lever 11 through which it passes has applied to it nuts $11^b$, $11^b$, by adjustment of which the rod 10 may be adjusted lengthwise to secure the result referred to.

While I have described the invention as an improvement in stop-motion mechanism, and with reference more especially to the attainment of the stopping function, various features and combinations embraced in the invention are not necessarily restricted to use for stopping purposes, and I therefore regard it as within the scope of my invention to utilize such features and combinations either for stopping purposes or for signaling purposes.

I claim as my invention:—

1. Stop-motion mechanism comprising tripping-devices including a dog, detectors controlled by yarns or threads, a feeler, and a transmitter moving in correlation with the feeler, which in its stroke engages but communicates free clearance movement in one direction to said dog while the feeler is unobstructed and when the feeler is obstructed actuates the tripping-devices by engaging and moving the dog in a different direction.

2. Stop-motion mechanism comprising tripping-devices including a dog, detectors controlled by yarns or threads, a feeler, and a transmitter, moving in correlation with the feeler, which in its stroke engages but clears the dog while the feeler is unobstructed and when the feeler is obstructed engages and carries with it the dog and actuates the tripping-devices through such engagement.

3. Stop-motion mechanism comprising tripping-devices including a dog, detectors controlled by yarns or threads, a feeler, and a transmitter which moves in correlation with the feeler and in its stroke engages the dog, and which clears the latter when the feeler is unobstructed but when the feeler is obstructed fails to clear the dog and operates in its return movement to actuate the tripping-devices through engagement with the dog.

4. Stop-motion mechanism comprising tripping-devices including a dog, detectors controlled by yarns or threads, a feeler, and a transmitter which moves in correlation with the feeler and in its stroke idly engages the dog while the feeler is unobstructed but when the feeler is obstructed operates in the return movement of the feeler to actuate the tripping-devices through engagement with the dog.

5. Stop-motion mechanism comprising tripping-devices including a dog, detectors controlled by yarns or threads, a feeler, and a transmitter through which the feeler is actuated, which imparts a regular beat to the dog while the feeler is unobstructed and when the feeler is obstructed actuates the tripping-devices by imparting movement in a different direction to the dog.

6. Stop-motion mechanism comprising tripping-devices including a dog, detectors controlled by yarns or threads, a feeler, and a transmitter through which the feeler is actuated, which imparts a regular beat to the dog while the feeler is unobstructed and when the feeler is obstructed fails to clear the dog and operates in the return movement of the transmitter to actuate the tripping-devices by means of the dog.

7. Stop-motion mechanism comprising tripping-devices including a dog, detectors controlled by yarns or threads, a feeler, and a transmitter through which the feeler is actuated, which imparts a regular beat to the dog while the feeler is unobstructed and when the feeler is obstructed fails to clear the dog and operates in the return movement of the feeler to actuate the tripping devices by means of the dog.

8. Stop-motion mechanism comprising tripping-devices including a dog, detectors controlled by yarns or threads, a feeler, and a transmitter having give-way provisions through which the feeler is yieldingly actuated, which imparts a regular beat to the dog while the feeler is unobstructed and when the feeler is obstructed actuates the tripping-devices positively by means of the dog.

9. Stop-motion mechanism comprising tripping-devices including a dog, detectors controlled by yarns or threads, a feeler, and a transmitter having give-way provisions through which the feeler is yieldingly actuated, which imparts a regular beat to the dog while the feeler is unobstructed and when the feeler is obstructed fails to clear the dog and operates in its return movement to positively actuate the tripping-devices by means of the dog.

10. Stop-motion devices comprising detectors controlled by yarns or threads, a feeler, an actuator, a transmitter through which the actuator actuates the feeler, and tripping-devices including a dog given a regular beat by the transmitter while the feeler is unobstructed, the said transmitter interrupting the beat of the dog when the feeler is obstructed and thereupon imparting movement to the tripping-devices by means of the dog.

11. Stop-motion devices comprising detectors controlled by yarns or threads, a feeler, an actuator, a transmitter having give-way provisions and through which the actuator actuates the feeler yieldingly, and tripping-devices including a dog given a regular beat by the transmitter while the feeler is unobstructed, but interrupted in its beat by the transmitter when the feeler is obstructed, the transmitter thereupon positively actuating the tripping-devices by means of the dog.

12. Stop-motion devices comprising detectors controlled by yarns or threads, a feeler, an actuator, a transmitter through which the actuator actuates the feeler, and tripping-devices including a dog given clearance movement by said transmitter relative to the latter when the feeler is unobstructed, checked in uncleared position by the transmitter when the feeler is obstructed, and through movement of which the transmitter actuates the tripping-devices at such time.

13. Stop-motion devices comprising detectors controlled by yarns or threads, a feeler, an actuator, and tripping devices including a transmitter moving to and fro in unison with the feeler, and a dog moved transversely by said transmitter for clearance so long as the feeler is unobstructed, and moved lengthwise with it when the feeler is obstructed to effect the tripping.

14. Stop-motion devices comprising detectors controlled by yarns or threads, a feeler, an actuator, tripping-devices including a dog, and a transmitter coacting with said dog, through which transmitter said actuator transmits movement with yielding force to the feeler, and through which it actuates the tripping-devices positively by means of the dog when the feeler is obstructed.

15. In stop-motion devices, the combination with a feeler which moves to and fro, and tripping-devices, of devices through which the feeler controls the actuation of the tripping-devices, comprising a dog connected with one thereof and a coacting transmitter connected with the other thereof, said transmitter and said dog moving past each other so long as the feeler is unobstructed but engaging and moving with each other to actuate the tripping-devices when the feeler is obstructed.

16. In stop-motion devices, the combination with a feeler, an actuator, and tripping-devices having a movable dog, of a transmitter actuated by said actuator comprising spring-tensioned members transmitting movement with yielding force to the feeler, moving relative to said dog while the feeler is unobstructed, and adapted to actuate the tripping-devices positively through engagement with the dog when the feeler is obstructed.

17. In stop-motion devices, the combination with a feeler, an actuator, and tripping-devices having a movable dog, of a transmitter comprising spring-tensioned levers receiving between the same at opposite sides of their pivotal mounting projections in connection with the actuator and feeler, respectively, the said levers adapted to transmit movement with yielding force to the feeler, moving relative to said dog while the feeler is unobstructed, and engaging the dog and actuating the tripping-devices positively when the feeler is obstructed.

18. Stop-motion mechanism comprising a feeler movable to and fro, a member having a to-and-fro movement in correlation with that of the feeler, and tripping-devices having combined therewith a second member engaged by said first member and given thereby a transverse movement relative thereto so long as the feeler is unobstructed and when the feeler is obstructed arrested in such transverse movement by the first member and moved lengthwise therewith to effect tripping.

19. Stop-motion mechanism comprising tripping-devices including a dog capable of idle movement to and fro in one direction, detectors controlled by yarns or threads, a feeler, and a device moving in correlation with the feeler, acting upon said dog to produce said idle movement so long as the feeler is unobstructed, engaging with the dog when the feeler is obstructed, and through such engagement giving a working movement to the dog in a direction at an angle to said idle movement and thereby actuating the tripping-devices.

20. Stop-motion devices comprising detectors controlled by yarns or threads, a feeler, means for actuating the feeler, and tripping devices including an element moving to and fro in unison with the feeler and a coacting element moved transversely by said first mentioned element, the said elements clearing each other so long as the feeler is unobstructed, but failing to clear and the second element being moved by and with the first when the feeler is obstructed, to effect the tripping.

21. Stop-motion mechanism comprising tripping-devices, detectors controlled by yarns or threads, a feeler adapted to be limited in its stroke in either direction by a displaced detector, and means by which the said tripping-devices are actuated during a succeeding stroke of the feeler.

22. Stop-motion mechanism comprising tripping-devices, detectors controlled by yarns or threads, a feeler adapted to be limited in its stroke in either direction by a displaced detector, and means rendered operative by such limitation to actuate the said tripping-devices during the return stroke of the feeler.

23. Stop-motion mechanism comprising tripping-devices, detectors controlled by yarns or threads, a feeler adapted to be limited in its stroke in either direction by a displaced detector, and means rendered operative by such limitation to actuate the said tripping-devices during the return stroke of the feeler independently of pressure of the feeler against said detector.

24. Stop-motion mechanism comprising tripping-devices, detectors controlled by yarns or threads, a feeler adapted to be limited in its feeling stroke in either direction by a displaced detector, and means rendered operative by such limitation to actuate the said tripping-devices during the return stroke of the feeler.

25. Stop-motion mechanism comprising tripping-devices, detectors controlled by yarns or threads, a feeler, a swinging actuator, and a give-way device intermediate said actuator and feeler adapted to transmit movement to the feeler yieldingly against a displaced detector and to positively actuate the tripping-devices independently of the detectors in case of obstruction by such detector.

26. Stop-motion mechanism comprising tripping-devices, detectors controlled by yarns or threads, a feeler, an actuator, and a give-way device through which the actuator transmits a yielding feeling stroke to the feeler, and through which, also, it actuates positively the tripping-devices independently of the detectors when the feeler is obstructed by a detector.

27. Stop-motion mechanism comprising tripping-devices, detectors controlled by yarns or threads, a feeler, and actuating means for the said feeler, the said means including a give-way device adapted to impart a yielding feeling movement to the feeler and in case of obstruction by a detector positively actuate the tripping-devices during the return stroke of the feeler.

28. Stop-motion mechanism comprising tripping-devices, detectors controlled by yarns or threads, a feeler, an actuator, and a give-way device through which the actuator transmits a yielding feeling stroke to the feeler and through which, also, when the feeler is obstructed by a detector its actuates the tripping-devices positively during the return stroke of the feeler.

29. Stop-motion mechanism comprising tripping-devices including a movable dog, detectors controlled by yarns or threads, a feeler, an actuator, and a combined give-way and transmitter comprising relatively-movable members spring-held in opposite engagement with the actuator and also with the feeler, said members each in turn positively actuated by the actuator in one direction and at such time transmitting yielding movement to the other and the feeler, permitting said other member to be detained by the feeler when the latter is obstructed, together coacting with said dog to produce a relative transverse beat while the feeler is unobstructed, and when the feeler is obstructed the detained member interrupting the said transverse beat and the moving member actuating the tripping-devices positively by means of the dog.

30. Stop-motion mechanism comprising tripping-devices including a movable dog, detectors controlled by yarns or threads, a feeler, an actuator, and a combined give-way and transmitter comprising levers spring-held in opposite engagement with the actuator and also with the feeler, said levers each in turn positively actuated by the actuator in one direction and at such time transmitting yielding movement to the other and the feeler, permitting said other lever to be detained by the feeler when the latter is obstructed, the levers together coacting with the dog to produce a relative transverse beat while the feeler is unobstructed, and when the feeler is obstructed the detained lever interrupting the said transverse beat and the moving lever actuating the tripping-devices positively by means of the dog.

31. In stop-motion mechanism, in combination, detectors adapted to be controlled by yarns or threads, a feeler having a feeling movement in the direction of the length of the yarns or threads, a dog movable transversely with relation to the yarns or threads, a movable carrier for the said dog, knocking-off devices, and means operatively combined with said feeler imparting transverse movement to said dog while the feeler is unobstructed and engaging the same and moving it and its carrier lengthwise when the feeler is obstructed and thereby calling the knocking-off devices into action.

32. Feeler-actuating devices for stop-motion mechanism, comprising the combination with a feeler, movable to and fro, of an actuator, and a give-way device for transmitting movement to the feeler, consisting of a pair of individually movable levers receiving between them at opposite sides of their fulcra engaging members in connection with the actuator and the feeler, respectively, and respectively alternately actuated positively by the actuator by means of its engaging member, and a spring contracting said levers upon said engaging members and operating to transmit movement yieldingly from one lever to the other thereof and to the feeler by means of the latter's engaging member.

33. In stop-motion mechanism, the combination with a feeler that moves to and fro, a transmitter moving in correlation with the feeler, and a tripping dog coöperating with the said transmitter and having a transverse beat relative thereto during the normal working of the parts, of impact-deadening stopping means limiting the extent of the beat-movements and controlling rebound of the dog.

34. In stop-motion mechanism, the combination with a feeler that moves to and fro, a transmitter moving in correlation with the feeler, a tripping dog coöperating with said transmitter and having a transverse beat relative thereto during the normal working of the parts, and stops limiting the extent of the beat-movements, of "fiber" impact-deadening means for controlling rebound of said dog.

35. In stop-motion mechanism, the combination with a feeler that moves to and fro, a transmitter moving in correlation with the feeler, a tripping dog coöperating with the said transmitter and having a transverse beat relative thereto during the normal working of the parts, stops between which a portion of the dog moves to and fro, and means for deadening the impact and thereby controlling the rebound from the said stops.

36. In stop-motion mechanism, the combination with a feeler that moves to and fro, a transmitter moving in correlation with the feeler, a tripping dog coöperating with the said transmitter and having a transverse beat relative thereto during the normal working of the parts, and stops between which a portion of the dog moves to and fro, of impact-deadening means moving with the dog and coöperating with the said stop.

37. In stop-motion mechanism, the combination with a feeler that moves to and fro, a transmitter moving in correlation with the feeler, and a tripping dog coöperating with the said transmitter and having a transverse beat relative thereto during the normal working of the parts, of means for yieldingly checking the beat-movements of the dog.

38. In stop-motion mechanism, the combination with a feeler that moves to and fro, a transmitter moving in correlation with the feeler, and a tripping dog coöperating with the said transmitter and having a transverse beat relative thereto during the normal working of the parts, of weighted means for checking the beat-movements of the dog.

39. In stop-motion mechanism, the combination with a feeler that moves to and fro, a transmitter moving in correlation with the feeler, and a tripping dog coöperating with the said transmitter and having a transverse beat relative thereto during the normal working of the parts, of a weight which checks the beat in each direction.

40. In stop-motion mechanism, the combination with a feeler that moves to and fro, a transmitter moving in correlation with the feeler, and a tripping dog coöperating with the said transmitter and having a transverse beat relative thereto during the normal working of the parts, of a weight which checks the beat in each direction alternately with lost motion between the dog and weight during the intermediate portion of the beat.

41. In stop-motion mechanism, the combination with a feeler that moves to and fro, a transmitter moving in correlation with the feeler, and a swinging tripping dog coöperating with the said transmitter and given thereby a transverse beat during the normal working of the parts, the said dog having opposite checking shoulders, of a checking weight, and opposite rests for said weight which serve alternately as fulcra for the weight as it is acted upon by the respective shoulders in the to and fro swinging movement of the dog.

42. Stop-motion mechanism comprising tripping-devices including a movable dog, detectors controlled by yarns or threads, a feeler, a transmitter moving in correlation with the feeler, imparting clearance movement to the dog while the feeler is unobstructed and when the feeler is obstructed actuating the tripping-devices by engagement with the dog, and means for preventing at will such actuation and thereby suppressing temporarily the tripping function.

43. Stop-motion mechanism comprising tripping-devices including a movable dog, detectors controlled by yarns or threads, a feeler, a transmitter moving in correlation with the feeler, imparting clearance movement to the dog while the feeler is unobstructed and when the feeler is obstructed actuating the tripping-devices by engagement with the dog, and manually-operated means for preventing engagement of the dog and transmitter and thereby suppressing the tripping function.

44. Stop-motion mechanism comprising tripping-devices including a movable dog, detectors controlled by yarns or threads, a feeler, a transmitter moving in correlation with the feeler, imparting clearance movement to the dog while the feeler is unobstructed and when the feeler is obstructed actuating the tripping-devices by engagement with the dog, and means operable by the weaver for holding the dog out of engagement with the transmitter and thereby suppressing the tripping function.

45. Stop-motion mechanism comprising tripping-devices including a movable dog, detectors controlled by yarns or threads, a feeler, a transmitter moving in correlation with the feeler, imparting clearance-movement to the dog while the feeler is unobstructed, and when the feeler is obstructed actuating the tripping-devices by engagement with the dog, and a lock for said dog by which it is held out of operation, suspending the tripping action while the feeler devices continue in action.

46. Stop-motion mechanism comprising detectors controlled by yarns or threads, a feeler, tripping-devices including a moving dog through which the tripping-devices are actuated when the said feeler is obstructed, and locking means manually movable into engagement with the said dog for locking it in inoperative position without interfering with the action of the feeler.

47. In a stop-motion mechanism, in combination, knocking-off devices, a rocker, connections between said rocker and said knocking-off devices for actuating the latter into operation in either direction of rocking of the rocker, a dog connected with said rocker and normally movable parallel with the axis of the latter, a feeler, and means operatively combined with the feeler imparting movement to the dog parallel with the axis of the rocker while the feeler continues unobstructed, and when the feeler is obstructed, engaging with the dog and moving it in a plane at right angles to said axis, thereby swinging the dog and rocking the rocker.

48. In a stop-motion mechanism, in combination, knocking-off devices including a head having opposite curved slots, a rocker having opposite crank-pins occupying the said slots and normally engaged by ends of such slots, a feeler having feeling strokes in both directions, and means for rocking the rocker in one or the other direction, as the case may be, when the feeler is obstructed in either stroke, whereby through engagement of a pin with the adjacent end of its slot the head and connections are actuated and thereby the knocking-off devices called into action.

49. In a stop-motion mechanism, in combination, a rocker having a crank-head, knocking-off devices hung to the said crank-head, supported thereby, and normally operating to centralize the rocker, and feeler-mechanism including a feeler having feeling strokes in both directions, the said feeler-mechanism operating to rock the rocker in one or the other direction, as the case may be, when the feeler is obstructed in either direction, whereby through the crank-head the knocking-off devices are called into action.

50. In a stop-motion mechanism, in combination, knocking-off devices, a rocker which calls such devices into operation, a dog connected with said rocker and movable lengthwise of the axis of the latter, means operatively combined with the feeler imparting movement to the dog lengthwise of the axis of the rocker while the feeler continues unobstructed and rocking the rocker by engagement with the dog when the feeler is obstructed, and yielding resistance means opposing movement of the dog in either direction from its normal intermediate position and tending to return it to such position.

51. In a stop-motion mechanism, in combination, knocking-off devices, a rocker which calls such devices into operation, a dog connected with said rocker, adapted to swing lengthwise of the axis of the latter, and having opposite contact-shoulders, means operatively controlled by the feeler, imparting swinging movement to the dog in the said direction while the feeler continues unobstructed, a guide connected with said rocker, and a weight guided by said guide and adapted to be engaged and lifted by the said opposite shoulders of the dog alternately, the said weight adapted to rock upon opposite fulcra alternately in successive lifting movements.

52. Stop-motion mechanism comprising detectors controlled by yarns or threads, a feeler, tripping-devices, and means for actuating said tripping-devices under control of the feeler including a dog and a transmitter, one thereof operatively combined with the tripping-devices and the other with the feeler and movable in unison with the feeler, the latter member engaging the other member without operating the tripping-devices while the feeler is unobstructed, and engaging such other member and operating the tripping-devices when the feeler is obstructed.

53. In stop-motion mechanism, detectors controlled by yarns or threads, a feeler, tripping-devices having a dog, and a spring-tensioned two-part combined give-way and transmitter transmitting yielding movement to the feeler and moving idly relative to the dog while the feeler is unobstructed, the members thereof caused to change relative position through obstruction to the feeler-movement, and one thereof acting thereupon by engagement with the dog to actuate the said tripping-devices.

In testimony whereof I affix my signature in presence of two witnesses.

HENRY A. OWEN.

Witnesses:
ELLEN O. SPRING,
ELSIE A. BARTZSCH.